United States Patent [19]

Nakasuji et al.

[11] Patent Number: 4,808,483
[45] Date of Patent: Feb. 28, 1989

[54] PRIMER COMPOSITIONS

[75] Inventors: Katsuyoshi Nakasuji; Ryuzo Mikami, both of Ichihara, Japan

[73] Assignee: Toray Silicone Co., Ltd., Tokyo, Japan

[21] Appl. No.: 629,138

[22] Filed: Jul. 9, 1984

Related U.S. Application Data

[62] Division of Ser. No. 555,756, Nov. 28, 1983, abandoned.

[30] Foreign Application Priority Data

Mar. 18, 1983 [JP] Japan ................................ 58-45709

[51] Int. Cl.$^4$ ............................ B32B 9/04; B05D 3/10
[52] U.S. Cl. .................................. 428/447; 427/299; 427/322; 427/327; 427/387; 427/388.1; 427/388.5; 427/407.1; 427/407.2; 427/409; 427/410; 428/448
[58] Field of Search .............. 525/476, 477, 523, 525, 525/507; 428/447, 448; 427/387, 388.1, 388.5, 299, 322, 327, 407.1, 407.2, 409, 410

[56] References Cited

U.S. PATENT DOCUMENTS

| 4,022,948 | 5/1977 | Smith | 428/448 |
| 4,235,954 | 11/1980 | Humphrey | 428/448 |
| 4,283,513 | 8/1981 | Mikami | 525/477 |
| 4,287,326 | 9/1981 | Mikami | 525/476 |
| 4,308,309 | 12/1981 | Leiser et al. | 428/448 |
| 4,332,844 | 6/1982 | Hamada | 428/448 |

Primary Examiner—Janyce Bell
Attorney, Agent, or Firm—Robert L. McKellar

[57] ABSTRACT

What is disclosed are novel compositions of matter which are useful as primers to bind room-temperature curable silicone, and silicone-modified rubbers, to various substrates. An example is the use of a mixture which is a reaction product of methyltrimethoxysilane and a bisphenol resin; an epoxyfunctional silane, and tetrabutyl titanate, to bond a room-temperature curable silicone rubber, which cures by a reaction which eliminates alcohol as a by-product, to an aluminum substrate.

27 Claims, No Drawings

PRIMER COMPOSITIONS

This application is a division of application Ser. No. 555,756, filed Nov. 28, 1983, now abandoned.

BACKGROUND OF THE INVENTION

This invention deals with primer compositions. More specifically, this invention describes primer compositions which bind room temperature-curable silicone rubbers, or room temperature-curable silicone-modified organic rubbers, firmly to the surface of various base materials.

Large quantities of room temperature-curable silicone rubbers have been used as sealants in various structures and buildings because the rubber itself exhibits a durability far superior to the durability of other organic rubbers. At the same time, room temperature-curable silicone-modified organic rubbers have appeared and are occasionally used as sealants in structures and buildings. Structures and buildings employ various base materials such as metals such as aluminum, steel and stainless steel; painted construction materials such as acrylic resin-coated aluminum; hard inorganic construction materials such as glass, tile and building stone and porous inorganic base materials such as mortar, concrete and ALC which is a foamed concrete. It is very important that a room temperature-curable silicone rubber or room temperature-curable silicone-modified organic rubber be tightly bound to the above base materials. For this reason, these base materials are usually treated with various primers and then coated with a room temperature-curable silicone rubber or room temperature-curable silicone-modified organic rubber which is simultaneously adhered and cured. However, some of these base materials, such as pure aluminum, surface-treated aluminum, stainless steel, various rein-coated aluminums and mortar are difficult to adhere and seal with the result that a silicone rubber of silicone-modified organic rubber will peel at the interface between the rubber and base material prior to extensive degradation and loss of elasticity in the rubber. Thus, there is a requirement for a primer which has a high adhesive strength for a long term and in particular has a high adhesive strength for a long term when immersed in water.

Primers which consist of mixtures of epoxy resins and organofunctional silanes are known in the prior art, but since unmodified epoxy resins are employed, miscibility with the silicone component in the form of silanes is inadequate. As a result, it is impossible to obtain a homogeneous, durable adhesive film. Thus, these products are unsatisfactory as primers.

To overcome the above drawbacks, the present inventors have previously proposed one-component primer compositions based on organotitanium esters and silicone-modified epoxy resins which contain epoxy groups and silicon-bonded alkoxy groups. As a result of additional research, it has been discovered that when certain alkoxysilanes or their partial hydrolyzates are mixed with these compositions, the durability of adhesion is improved and the storage stability of these one-component primers is improved.

THE INVENTION

The objective of the present invention is to provide a primer composition which can be used to bind, both solidly and durably, various rubbers, and in particular room temperature-curable silicone rubbers and room temperature-curable silicone modified organic rubbers, to various substrates.

That is, this invention deals with a composition comprising (A) 100 parts by weight of silicone-modified epoxy resin which contains epoxy groups and silicon-bonded alkoxy groups and which is produced by the condensation reaction of (a) an alkoxy-containing silicon compound with the average unit formula $R_a^1 SiX_b O_{(4-a-b)/2}$ wherein $R^1$ represents a monovalent hydrocarbon group, X represents an alkoxy group, a is 0, 1 or 2, b is 1, 2, 3 or 4 and the value of $a+b$ is from 1 to 4 with (b) an epoxy resin which contains both epoxy and hydroxyl groups in each molecule, (B) 1 to 200 parts by weight, based on 100 parts of component (A), of an epoxy-containing organosilicon compound selected from epoxy functional silanes with the general formula

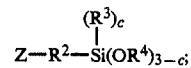

$$Z-R^2-Si(OR^4)_{3-c}$$

mixtures of such silanes and, partial hydrolyzates of such silanes, wherein $R^2$ represents a divalent hydrocarbon radical, $R^3$ and $R^4$ both represent monovalent hydrocarbon radicals, Z represents a glycidoxy or epoxycyclohexyl group and c is 0 or 1, and (C) 0.1 to 100 parts by weight, based on 100 parts of component (A), of an organotitanium acid ester.

Component (A) is the principal material of a primer composition produced by the method of this invention. $R^1$ in component (a), a starting material for component (A), is a silicon-bonded monovalent hydrocarbon group. Examples of such groups are alkyl groups such as methyl, ethyl, propyl and octadecyl; alkenyl groups such as vinyl and allyl; aryl groups such as phenyl; these groups in which hydrogen has been substituted by halogen, the cyano group, the mercapto group or the hydroxyl group and alkyl groups in which a portion of the hydrogen has been substituted by functional groups such as methacryloxy, acryloxy, glycidyl and 3,4-epoxycyclohexyl.

X represents an alkoxy group such as methoxy, ethoxy, propoxy or methoxyethoxy. As indicated, $R^1$ may or may not be present in component (a). The reason why the value of a is 2 or less and the value of b is 1 or more is that starting with a smaller number of alkoxy groups in (a) plus condensation of the alkoxy groups with the hydroxyl groups in component (b) causes a smaller number of silicon-bonded alkoxy groups in component (A), which results in inadequate curing and thus inadequate adhesion. Due to this, the number of X groups in component (a) preferably should be at least 2 and in component (A) the number should be at least 3.

Component (a) is either a silane or a polysiloxane. The silane may be a monosilane or disilane. In the case of a polysiloxane, the degree of polymerization is 2 or more, but not too large. The molecular configuration of such a polysiloxane is linear, branched chain or network and the polysiloxane may contain a small amount of silicon-bonded hydroxyl groups, halogen or hydrogen. Examples of component (a) useful in this invention are methyltrimethoxysilane, dimethyldiethoxysilane, ethyltriethoxysilane, phenyltrimethoxysilane, methylphenyldiethyoxysilane, vinyltrimethoxysilane, vinyltri(methoxyethoxy)silane, methylvinyldimethoxysilane, allyltripropoxysilane, gamma-chloropropyltriethoxysilane, gamma-methacryloxypropyltrimethoxysilane, methyl(-gamma-methacryloxypropyl)dimethoxysilane, gamma-glycidoxypropyltrimethoxysilane, beta-(3,4-epoxycyclohexyl)ethyltrimethoxysilane, tetramethoxysilane, tetraethoxysilane, tetrapropoxysilane, tetrabutoxysilane, the partial hydrolysis and condensation products of these compounds and ethyl polysilicate. These compounds may be used individually or as mixtures. Of these compounds, low molecular weight organoalkoxysilanes such as methyltrimethoxysilane and ethyltrimethoxysilane are preferred from the standpoint of their ease of reaction with the hdyroxyl groups of the epoxy resin.

Component (b), the other starting material for component (A), is a bisphenol or novolak epoxy resin which contains at least one hydroxyl and one epoxy group per molecule; however, bisphenol types are preferred. Particularly preferred are epoxy resins with the general formula

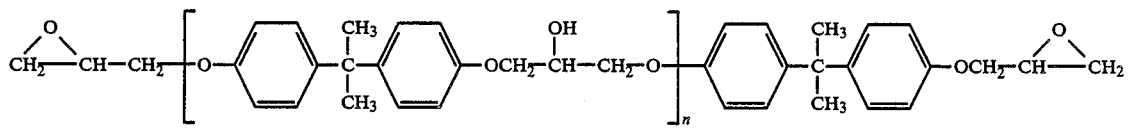

wherein n is an integer with a value of 1 to 19, which are the condensation products of bisphenol A with epichlorohydrin. In the present invention, the average molecular weight of the epoxy resin is divided by the number of hydroxyl groups actually present per molecule of the epoxy resin to give the hydroxyl group equivalent weight. The hydroxyl group equivalent weight should be at least 300 and preferably is 340–550. When the hydroxyl group equivalent weight exceeds this range, the degree of modification of component (b) by the silicone compound declines which results in difficulties in the formation of an excellent film. On the other hand, when the hydroxyl group equivalent weight falls below 300, unreacted hydroxyl groups tend to remain under the usual condensation reaction conditions for component (a) and component (b) and the storage stability after the condensation reaction or upon the mixing of component (A) with the organotitanium acid ester comprising component (C), is reduced, resulting in the ready occurrence of a viscosity increase and gelation. The epoxy equivalent weight should range over 180 to 4,000. The average molecular weight is preferably 300 to 6,000 and more preferably 700 to 2,000. Component (A) can be produced by mixing the above components (a) and (b) and heating the mixture to a temperature above the boiling point of the liberated alcohol in order to carry out the alcohol-liberating condensation of the alkoxy groups in component (a) with the hydroxyl groups in component (b). This reaction readily proceeds at a temperature of 80° to 160° C. in the absence or presence of a small amount of a condensation catalyst while the liberated alcohol is removed from the reaction system. A solvent or diluent is optionally used for the reaction and examples of such diluents include organic solvents such as toluene, xylene and ethylacetate. An important point with regard to the reaction is that the hydroxyl groups in the epoxy resin must be reacted as completely as possible. To this end, a small amount of a condensation catalyst is advantageously used. It is desirable that the condensation reaction of component (a) with component (b) must be conducted under the condition that the number of equivalents of alkoxy groups in component (a): number of equivalents of hydroxyl groups in component (b) are greater than or equal to 1.

The reason is as follows. When the above value is less than 1, the mixture tends to gel during the condensation reaction. If the mixture does not gel in the condensation reaction, it will tend to gel after component (A) has been combined with the organotitanium acid comprising component (C). Gelation in the condensation reaction or upon the addition of component (C) becomes increasingly less likely as the above ratio increases.

The number of equivalents of alkoxy groups in component (a) denotes the number of equivalents of silicon-bonded alkoxy groups actually present in the number of grams of component (a) taken for the reaction of component (a) with component (b). For example, 0.10 equivalents of alkoxy groups are present in 4.5 g of methyltrimethoxysilane as follows. 1 mol of this silane weighs 136 g and one molecule of this silane contains 3 alkoxy groups so that 1 mol (136 g) of this silane contains 3 equivalents of alkoxy groups. Thus, 4.5 g of this silane contains 3 equivalents ×4.5g/136 g=0.10 equivalents. The number of equivalents of hydroxyl groups in component (b) denotes the number of equivalents of alcoholic hydroxyl groups actually present in the number of grams of component (b) which is taken for the reaction of component (a) with component (b).

Component (B) is a component which increases the bonding of the rubbers to the base material and it increases the durability of adhesion. In particular, the durability of adhesion in water, of a room temperature-curable silicone rubber or room temperature-curable silicone-modified organic rubber to the cured primer composition film is enhanced. It also improves the storage stability when the present primer composition is used as a one-component primer. Component (B) is an epoxy-containing organosilicon compound selected from among epoxy-containing silanes having the general formula

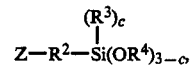

mixtures of such silanes and, partial hydrolyzates of such silanes, wherein $R^2$, $R^3$, $R^4$, c and Z have the definitions set forth above.

Examples of divalent hydrocarbon groups comprising $R^2$ are alkylene groups such as ethylene, propylene and pentylene; phenylene groups and cyclohexylene groups. Examples of monovalent hydrocarbon groups comprising $R^3$ are alkyl groups such as methyl, ethyl and hexyl; phenyl groups; vinyl groups and cyclohexyl groups.

Examples of monovalent hydrocarbon groups comprising $R^4$ are alkyl groups such as methyl, ethyl and propyl; cyclohexyl groups and alkoxyalkyl groups such as 2-methoxyethyl and 2-ethoxyethyl. Examples of these organosilicon compounds are the following compounds and their partial hydrolysis and condensation products.

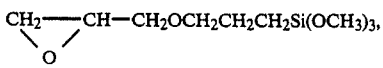

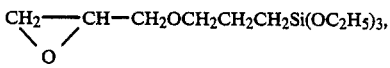

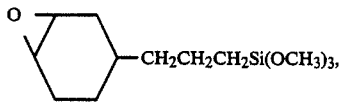

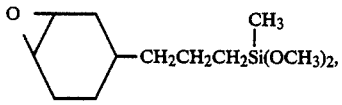

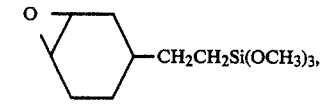

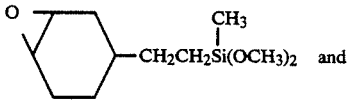 and

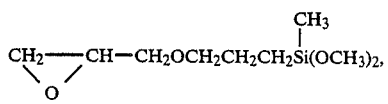

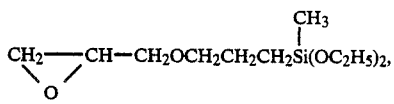

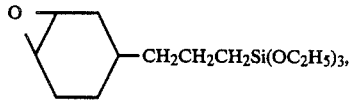

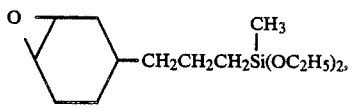

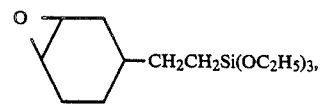

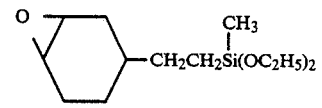

When the quantity of this component is insufficient, it is impossible to produce the effect of the present invention. If the quantity is too large, the drying period of the primer is shortened and the originally excellent film-forming capacity of the silicone-modified epoxy resin is reduced. Therefore, the quantity should be 1 to 200 parts by weight and preferably 5 to 100 parts by weight per 100 parts of compound (A).

The organotitanium acid ester comprising component (C) not only causes cure and imparts air dryability to the primer composition of the present invention, it also enhances the adhesion of the primers to substrates and the adhesion of a room temperature-curable silicone rubber or room temperature-curable silicone-modified organic rubber to the cured film of the primer composition.

What is meant by "cure" in this invention is that the silicone rubbers and silicone modified organic rubbers of this invention are converted from their soft, tacky, flowable uncured conditions into a hardened, tack-free, nonflowable state.

Examples of the titanium acid esters are titanium acid esters of monohydric alcohols such as methyl alcohol, ethyl alcohol, isopropyl alcohol, butyl alcohol, cyclohexyl alcohol, octyl alcohol and octadecyl alcohol; titanium acid esters of dihydric alcohols such as ethylene glycol, propylene glycol, octylene glycol, diethylene glycol, tripropylene glycol and tetraethylene glycol; titanium acid esters of trihydric alcohol such as glycerin; titanium chelates such as di-n-butoxybis(ethyl acetylacetate)-titanium, diisopropoxybis-(acetylacetonate)titanium and di-n-butoxybis(triethanolaminate)titanium; dihydroxybis(lactate)titanium and the partial hydrolysis products of these titanium compounds. This component may be a single compound or a mixture of two or more compounds. The quantity of this component in this invention should be 0.1 to 100 parts by weight and preferably 5 to 25 parts by weight per 100 parts by weight of component (A) in order to enhance air dryability, adhesiveness and storage stability. The primer composition of this invention can be produced by simply mixing the three components mentioned above. However, since component (C) is somewhat sensitive to moisture, it should be mixed in the absence of moisture and the mixture should be stored in a sealed container after the internal atmosphere of the container has been purged with dry air or dry nitrogen.

When the viscosity is too high or when a thin film is to be formed when coating the primer composition on a base material, the composition may be diluted with an organic solvent, such as toluene, xylene or ethyl acetate, which can dissolve it. On the other hand, when the viscosity is too low or the formation of a thick film is desired, the composition may be blended with various inorganic fillers such as finely divided silica. A hydrophobicized silica filler whose surface has been trimethylsilylated is appropriate for this purpose. In addition to components (A), (B) and (C), other organosilicon compounds such as mercaptosilanes, methacryloxysilanes and vinylsilanes and conventional thermal stabilizers and colorants such as red iron oxide, cerium oxide, fatty acid salts of iron and titanium oxide may be arbitrarily added as long as they do not adversely affect the primers of this invention.

The primer compositions produced by the method of this invention are one-component type and exhibit excellent storage stability and air dryability and they tightly and durably adhere a room temperature-curable silicone rubber or room temperature-curable silicone-modified organic rubber, even while curing, to various base materials, and especially to stainless steel when brought into contact with the rubber. In particular, since the primer compositions exhibit excellent durability of adhesion in long-term immersion in water or immersion in hot water, they are appropriate as pretreating agents. The room temperature-curable silicone rubber may be either a one-component or two-component type and may be an alcohol-liberating, oxime-liberating, ketone-liberating, amine-liberating, hydroxylamine-liberating or carboxylic acid-liberating type. Similarly, the room temperature-curable silicone-modified organic rubber is either a one-component or two-component type and examples of such materials are terminal-alkoxysilylated polyether rubbers, terminal-alkoxysilylated polybutadiene rubbers and terminal-alkoxysilylated polyurethane rubbers.

These rubbers are tightly and quite durably adhered to difficult-to-adhere base materials such as pure aluminum, surface-treated aluminum, coated aluminum, stainless steel, mortar and concrete which have been pretreated with a primer composition produced by the method of this invention. Joints of various parts which comprise the interface of two different base materials in a building can thus be smoothly sealed.

This invention will be explained using the following examples. The viscosity was measured at 25° C. and "parts" denotes "parts by weight".

EXAMPLE 1

Four hundred fifty g of a bisphenol epoxy resin (Epikote 1001 by Shell, average molecular weight =900–1000, 1.00–1.11 hydroxyl group equivalents, hydroxyl group equivalent weight =450–500, epoxy group equivalent weight =450–525), 1050 g of methyltrimethoxysilane (SH 6070 Silane from Toray Silicone Col, Ltd., corresponds to 23.2 equivalents of methoxy groups) and 1 g of tetrabutyl titanate (number of equivalents of methoxy groups/number of equivalents of hydroxyl groups =23.2–20.9) were charged to a 2 L three-necked flask equipped with a stirrer, reflux condenser and thermometer. The resulting mixture was gradually heated with stirring in order to conduct a condensation reaction at reflux (88° to 100° C.). The reaction mixture was initially opaque; however, it gradually became transparent. The reaction mixture was further reacted for 5 hours at reflux while the methyl alcohol by-product and the unreacted methyltrimethoxysilane were removed through a distillation tube. After the reaction, the unreacted methyltrimethoxysilane was in part distilled off to obtain a light yellow, transparent liquid (nonvolatiles, 373. wt %). The nonvolatiles were analyzed by gel permeation chromatography and infrared absorption spectroscopy and were determined to be a silicone-modified epoxy resin which contained both epoxy and methoxy groups and was the condensation reaction product of the hydroxyl groups of the epoxy resin and the methoxy groups of the methyltrimethoxysilane.

One hundred parts by weight of the resulting silicone-modified epoxy resin, 50 parts by weight gamma-glycidoxypropyltrimethoxysilane and 25 parts by weight tetrabutyl titanate were mixed to homogeneity in the absence of moist air to prepare a primer composition. The resulting primer composition was coated on two mortar test plates (size: 25×50×50 mm) which were subsequently allowed to stand and dry at 20° C. for 6 hours. Next, an aminoxy-type two-liquid room temperature-curable silicone rubber (Sealant SH 792 by Toray Silicone Co., Ltd.) was placed between the two test sheets and an adhesion test specimen was prepared according to the specifications on tensile adhesive strength in JIS-A5758 5.12, "Sealants for Construction". After the sample had stood at room temperature for 14 days, the initial physical properties of the sample and its physical properties after immersion in water at 50° C. for 7 days were examined. The results are summarized in Tables 1 and 2.

TABLE 1

| | Primer Composition Sample No. | | |
|---|---|---|---|
| Components | 1 (invention) | 2* (comparison) | 3* (comparison) |
| Silicone-modified epoxy resin (parts) | 100 | 100 | — |
| Gamma-glycidoxy-propyltrimethoxy-silane (parts) | 50 | — | 100 |
| Tetrabutyl titanate (parts) | 25 | 25 | 25 |

*Outside the scope of this invention

TABLE 2

| | Results of Tensile Adhesive Strength Tests | | | | | |
|---|---|---|---|---|---|---|
| | Initial | | | After Immersion In Warm Water | | |
| Sample No. | $M_{50}$ | T | E | $M_{50}$ | T | E |
| 1 | 1.0 | 4.5 | 850 | 0.9 | 4.0 | 750 |
| 2 | 1.0 | 4.4 | 860 | 0.9 | 3.0 | 670 |
| 3 | 1.0 | 3.1 | 520 | Peeling at interface between substrate and rubber | | |

$M_{50}$ = Tensile stress at 50% elongation in kg/cm$^2$
T = Stress at rupture in kg/cm$^2$
E = Elongation at break in %

EXAMPLE 2

One hundred parts by weight of the silicone-modified epoxy resin of Example 1, 65 parts of beta-(3,4-epoxycyclohexyl)ethyltriethoxysilane, 50 parts gamma-mercaptopropyltrimethoxysilane and 25 parts tetrabutyl titanate were mixed to homogeneity in the absence of moist air and a primer composition (sample 4) was prepared.

The composition was coated on two mortar plates and two aluminum plates and they were dried at normal temperature for 6 hours. Next, an aminoxy-type two component room temperature-curable silicone rubber (Sealant SH 792 by Toray Silicone Co., Ltd.) was placed between the test sheets and adhesion test specimens were prepared according to the specifications on tensile adhesive strength in JIS-A5658 5.12, "Sealants for Construction". After standing at room temperature for 14 days, the initial physical properties of the specimens and their physical properties after immersion in water at 50° C. for 7 days were examined. The results are summarized in Table 3.

TABLE 3

| | Results of Tensile Adhesive Strength Tests | | | | | |
|---|---|---|---|---|---|---|
| Adhesion | Initial | | | After Immersion In Warm Water | | |
| Specimen | $M_{50}$ | T | E | $M_{50}$ | T | E |
| Mortar sheet | 1.0 | 4.5 | 850 | 0.9 | 4.0 | 750 |
| Aluminum sheet | 1.0 | 4.4 | 860 | 0.9 | 3.0 | 670 |

EXAMPLE 3

One hundred parts by weight of the silicone-modified epoxy resin of Example 1, 50 parts gamma-glycidoxypropyltrimethoxysilane, 50 parts of the aminoxysilicone compound represented by the general formula

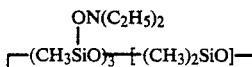

40 parts gamma-mercaptopropyltrimethoxysilane and 35 parts bis(acetylacetonato)diisopropoxytitanium were mixed in the absence of moist air to prepare a primer composition (sample 5). This primer was placed between mortar sheets (Size: 25×50×50 mm) and aluminum sheets (size: 1.0×50 mm). After air drying for two hours, an aminoxy-type room temperature-curable silicone rubber (Sealant SH 792 by Toray Silicone Co., Ltd.) was placed between the primer-coated surfaces of each test piece and samples were prepared according to the specifications on tensile adhesive strength in JIS-A5658 5.12, "Sealants for Construction". After standing at room temperature for 14 days, the initial physical properties of the samples and their physical properties after immersion in water at 50° C. for 7 days were examined. The results are summarized in Tables 4 and 5. For a comparison example, a primer composition (sample 6) identical to the above primer composition was prepared except that it contained no gamma-glycidoxypropyl-trimethoxysilane and tests identical to the above were conducted. The results are also summarized in Tables 4 and 5.

TABLE 4

Primer Composition

| Components | Sample No. 5 (invention) | 6* (comparison) |
|---|---|---|
| Silicone-modified epoxy resin (parts) | 100 | 100 |
| Gamma-glycidoxy-propyltrimethoxy-silane (parts) | 50 | 50 |
| Aminosilicone compound (parts) | 50 | 50 |
| Gamma-mercaptopropyl-trimethoxysilane (parts) | 45 | — |
| Bis(acetylacetonato)di-isopropyltitanium (parts) | 35 | 35 |

*Outside the scope of this invention

TABLE 5

Results of Tensile Adhesive Strength Tests

| Sample No. | Adhesion Specimen | Initial | | | After Immersion In Warm Water | | |
|---|---|---|---|---|---|---|---|
| | | $M_{50}$ | T | E | $M_{50}$ | T | E |
| 5 | mortar plate | 1.0 | 4.6 | 870 | 0.9 | 4.3 | 850 |
| | aluminum plate | 1.0 | 6.0 | 1000 | 0.9 | 5.7 | 920 |
| 6 | mortar plate | 1.0 | 4.5 | 860 | 0.9 | 4.4 | 750 |
| | aluminum plate | 1.0 | 6.0 | 1000 | 0.9 | 5.0 | 790 |

Two primer compositions identical to the above were prepared and enclosed in glass bottles and allowed to stand at 20° C. for a year and the viscosity was then measured. The sample which contained gamma-glycidoxypropyltrimethoxysilane had virtually the same viscosity as immediately after preparation while the gamma-glycidoxypropyltrimethoxysilane-free sample had a viscosity twice as high as its initial value.

EXAMPLE 4

Five hundred twenty-four g gamma-glycidoxy-propyltrimethoxysilane, 36 g of distilled water and 0.15 g potassium hydroxide were charged to 500 mL tree-neck flash equipped with stirring, reflux condenser and thermometer. While the contents were agitated, the temperature was gradually elevated to 70° C. and a condensation reaction was carried out while methanol was distilled out of the system. After the reaction had been completed, the potassium hydroxide was neutralized with carbon dioxide. Subsequently, unreacted gamma-glycidoxypropyltrimethoxysilane and the residual methanol were distilled out of the reaction system at a high vacuum. The residue was filtered and then analyzed. It was determined that the reactant was the partial hydrolyzate of gamma-glycidoxypropyltrimethoxysilane. A primer composition identical to sample 1 of Example 1 was prepared except that it contained the above reaction product instead of the gamma-glycidoxypropyltrimethoxysilane comprising the primer composition of sample 1. Subsequently, the physical properties of the resulting primer were measured under the conditions of Example 1. The results were almost identical to those for the primer composition of sample 1 of Example 1.

EXAMPLE 5

A primer composition identical to sample 1 of Example 1 was coated on four mortar test sheets and four aluminum test sheets and they were air dried at room temperature. Subsequently, an oxime-liberating one-component silicone sealant (Sealant SH 780 by Toray Silicone Col, Ltd.) and an alcohol-liberating one-component silicone sealant (Sealant SH 9145 by Toray Silicone Co. Ltd.) as room temperature-curable silicone rubbers were respectively placed between two of each kind of sheet. After standing at room temperature for 14 days, the test sheets were peeled. All the samples presented failure in the rubber layer and the rupture surface presented 100% cohesive failure.

EXAMPLE 6

One hundred g of an allyl-terminated oxypropylene polymer (average molecular weight: 400) were charged to an autoclave and 23 g of methyldimethoxysilane and 0.006 g of a platinum-ethylene complex were added under nitrogen and the mixture was agitated at 100° C. for 1 hour. The reaction product was mixed with 120 g calcium carbonate, 40 g fused silica filler, 40 g dioctyl phthalate and 2 g dibutyltin dilaurate to prepare an alkoxysilyl-terminated room temperature-curable polyether rubber.

The sample 1 of Example 1 was coated on two mortar test sheets and two aluminum test sheets and these were air dried at normal temperature. The above room temperature-curable rubber was placed between the primer-coated surfaces of two sheets of the same type. After standing at room temperature for 14 days, the test sheets were peeled. All the samples presented fracture in the rubber layer and the fracture surface presented 100° cohesive failure.

EXAMPLE 7

Seventy g of a 20 weight percent xylene solution of a hydroxyl-terminated polybutadiene which had a molecular weight appropriate for curing into a rubber and 0.20 g of the silane represented by the formula $(CH_3O)_3$ SiCH$_2$CH(CH$_3$)CH$_2$SH were mixed and the mixture was heated at 100° C. for 24 hours to produce a terminal-alkoxysilylated polybutadiene. This modified polybutadiene was mixed with 1.63 g of methyltrimethoxysilane and 0.82 g of titanium acetonylacetate to obtain an alkoxysilyl-terminated room temperature-curable rubber.

The sample 4 primer of Example 2 was coated on two mortar test sheets and two aluminum test sheets and they were dried at normal temperature for 4 hours. Next, the above room temperature-curable rubber was placed between the primer-coated surfaces for two sheets of the same type. After standing for 14 days, the test sheets were peeled. All samples presented failure in the rubber layer and the fracture surface presented a 100% cohesive failure.

That which is claimed is:

1. A primed substrate, when primed with a composition comprising
   (A) 100 parts by weight of silicone-modified epoxy resin which contains epoxy groups and silicon-bonded alkoxy groups and which is produced by the condensation reaction of
      (a) an alkoxy-containing silicon compound with the average unit formula R$_a^1$SiX$_b$O$_{(4-a-b)/2}$ wherein R$^1$ represents a monovalent hydrocarbon group, X represents an alkoxy group, a is 0, 1, or 2, b is 1, 2, 3 or 4 and the value of a +b is from 1 to 4 with
      (b) an epoxy resin which contains both epoxy and hydroxyl groups in each molecule,
   (B) 1 to 200 parts by weight, based on 100 parts of component (A), of an epoxy-containing organosilicon compound selected from epoxy functional silanes with the general formula

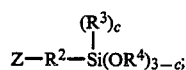

mixtures of such silanes and, partial hydrolyzates of such silanes, wherein R$^2$ represents a divalent hydrocarbon radical, R$^3$ and R$^4$ both represent monovalent hydrocarbon radicals, Z represents a glycidoxy or epoxycyclohexyl group and c is 0 or 1, and (C) 0.1 to 100 parts by weight, based on 100 parts of component (A), of an organotitanium acid ester.

2. A substrate as claimed in claim 1 wherein the substrate is aluminum.
3. A substrate as claimed in claim 1 wherein the substrate is steel.
4. A substrate as claimed in claim 1 wherein the substrate is stainless steel.
5. A substrate as claimed in claim 1 wherein the substrate is acrylic resin coated aluminum.
6. A substrate as claimed in claim 1 wherein the substrate is glass.
7. A substrate as claimed in claim 1 wherein the substrate is tile.
8. A substrate as claimed in claim 1 wherein the substrate is building stone.
9. A substrate as claimed in claim 1 wherein the substrate is mortar.
10. A substrate as claimed in claim 1 wherein the substrate is concrete.
11. A substrate as claimed in claim 10 wherein the substrate is foamed concrete.
12. "A primed substrate surmounted by a roomtemperature cured silicone-modified organic rubber wherein the primer on the primed substrate is a composition comprising
    (A) 100 parts by weight of silicone-modified epoxy resin which contains epoxy groups and silicon-bonded alkoxy groups and which is produced by the condensation reaction of
       (a) an alkoxy-containing silicone compound with the average unit formula R$_a^1$SiX$_b$O$_{(4-a-b)/2}$ wherein R$^1$ represents a monovalent hydrocarbon group, X represents an alkoxy group, a is 0, 1, or 2, b is 1, 2, 3 or 4 and the value of a +b is from 1 to 4 with
       (b) an epoxy resin which contains both epoxy and hydroxyl groups in each molecule,
    (B) 1 to 200 parts by weight, based on 100 parts of component (A), of an epoxy-containing organosilicon compound selected from epoxy functional silanes with the general formula

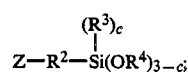

mixtures of such silanes and, partial hydrolyzates of such silanes, wherein R$^2$ represents a divalent hydrocarbon radical, R$^3$ and R$^4$ both represent monovalent hydrocarbon radicals, Z represents a glycidoxy or epoxycyclohexyl group and c is 0 or 1, and (C) 0.1 to 100 parts by weight, based on 100 parts of component (A), of an organotitanium acid ester.

13. A primed substrate as claimed in claim 12 wherein the room-temperature cured silicone-modified organic rubber is a terminal-alkoxysilylated polyether rubber.
14. A primed substrate as claimed in claim 13 wherein the alkoxysilylation group is the methoxy group.
15. A primed substrate as claimed in claim 12 wherein the room-temperature cured silicone-modified organic rubber is a terminal-alkoxysilylated polybutadiene rubber.
16. A primed substrate as claimed in claim 15 wherein the alkoxysilylation group is the methoxy group.
17. A primed substrate as claimed in claim 12 wherein the room-temperature cured silicone-modified organic rubber is a terminal-alkoxysilylated polyurethane rubber.
18. A primed substrate as claimed in claim 17 wherein the alkoxysilylation group is the methoxy group.
19. A primed substrate as claimed in claim 17 wherein the silicone rubber cures by the elimination of an alcohol as a byproduct of the cure reaction.
20. A primed substrate as claimed in claim 17 wherein the silicone rubber cures by the elimination of an oxime as a byproduct of the cure reaction.
21. A primed substrate as claimed in claim 17 wherein the silicone rubber cures by the elimination of a ketone as a byproduct of the cure reaction.
22. A primed substrate as claimed in claim 17 wherein the silicone rubber cures by the elimination of an amine as a byproduct of the cure reaction.
23. A primed substrate as claimed in claim 17 wherein the silicone rubber cures by the elimination of a hydroxylamine as a byproduct of the cure reaction.
24. A primed substrate as claimed in claim 17 wherein the silicone rubber cures by the elimination of a carboxylic acid as a byproduct of the cure reaction.
25. A method of bonding a room-temperature cured silicone rubber to a solid substrate which comprises (i) treating a solid substrate with a primer composition comprising (A) 100 parts by weight of silicone-modified epoxy resin which contains epoxy groups and silicon-bonded alkoxy groups and which is produced by the condensation reaction of
- (a) an alkoxy-containing silicon compound with the average unit formula $R^1_a SiX_b O_{(4-a-b)/2}$ wherein $R^1$ represents a monovalent hdyrocarbon group, X represents an alkoxy group, a is 0, 1, or 2, b is 1, 2, 3 or 4 and the value of a +b is from 1 to 4 with
- (b) an epoxy resin which contains both epoxy and hydroxyl groups in each molecule, (B) 1 to 200 parts by weight, based on 100 parts of component (A), of an epoxy-containing organosilicon compound selected from epoxy functional silanes with the general formula

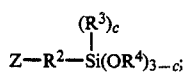

mixtures of such silanes and, partial hydrolyzates of such silanes, wherein $R^2$ represents a divalent hydrocarbon radical, $R^3$ and $R^4$ both represent monovalent hydrocarbon radicals, Z represents a glycidoxy or epoxycyclohexyl group and c is 0 or 1, and (C) 0.1 to 100 parts by weight, based on 100 parts of component (A), of an organotitanium acid ester;

(ii) contacting the substrate primed in step (i) with a room temperature curable silicone rubber, and (iii) allowing the room-temperature curable silicone rubber to cure.

26. A method of bonding a room-temperature cured silicone-modified organic rubber to a solid substrate which comprises (i) treating a solid substrate with a primer composition comprising (A) 100 parts by weight of silicone-modified epoxy resin which contains epoxy groups and silicon-bonded alkoxy groups and which is produced by the condensation reaction of
- (a) an alkoxy-containing silicon compound with the average unit formula $R^1_a SiX_b O_{(4-a-b)/2}$ wherein $R^1$ represents a monovalent hydrocarbon group, X represents an alkoxy group, a is 0, 1, or 2, b is 1, 2, 3 or 4 and the value of a +b is from 1 to 4 with
- (b) an epoxy resin which contains both epoxy and hydroxyl groups in each molecule, (B) 1 to 200 parts by weight, based on 100 parts of component (A), of an epoxy-containing organosilicon compound selected from epoxy functional silanes with the general formula

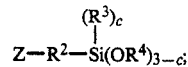

mixtures of such silanes and, partial hydrolyzates of such silanes, wherein $R^2$ represents a divalent hydrocarbon radical, $R^3$ and $R^4$ both represent monovalent hydrocarbon radicals, Z represents a glycidoxy or epoxycyclohexyl group and c is 0 or 1, and (C) 0.1 to 100 parts by weight, based on 100 parts of component (A), of an organotitanium acid ester;

(ii) contacting the substrate primed in step (i) with a room-temperature curable silicone-modified organic rubber, and (iii) allowing the room-temperature curable siliconemodified organic rubber to cure.

27. A primed substrate which is surmounted by a room-temperature cured silicone rubber wherein the primer on the primed substrate is a composition comprising (A) 100 parts by weight of silicone-modified epoxy resin which contains epoxy groups and silicon-bonded alkoxy groups and which is produced by the condensation reaction of
- (a) an alkoxy-containing silicon compound with the average unit formula $R^1_a SiX_b O_{(4-a-b)/2}$ wherein $R^1$ represents a monovalent hydrocarbon group, X represents an alkoxy group, a is 0, 1, or 2, b is 1, 2, 3 or 4 and the value of a +b is from 1 to 4 with
- (b) an epoxy resin which contains both epoxy and hydroxyl groups in each molecule, (B) 1 to 200 parts by weight, based on 100 parts of component (A), of an epoxy-containing organosilicon compound selected from epoxy functional silanes with the general formula

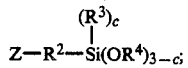

mixtures of such silanes and, partial hydrolyzates of such silanes, wherein $R^2$ represents a divalent hdyrocarbon radical, $R^3$ and $R^4$ both represent monovalent hydrocarbon radicals, Z represents a glycidoxy or epoxycyclohexyl group and c is 0 or 1, and (C) 0.1 to 100 parts by weight, based on 100 parts of component (A), of an organotitanium acid ester.

* * * * *